(12) United States Patent
Hadfield et al.

(10) Patent No.: US 10,574,729 B2
(45) Date of Patent: Feb. 25, 2020

(54) SYSTEM AND METHOD FOR CROSS PLATFORM DOCUMENT SHARING

(71) Applicant: Workshare, Ltd., London (GB)

(72) Inventors: Barrie Hadfield, London (GB); Richard Preen, London (GB); Tim Tanner, London (GB); Robin Glover, London (GB)

(73) Assignee: Workshare Ltd., Chicago, IL (US)

( * ) Notice: Subject to any disclaimer, the term of this patent is extended or adjusted under 35 U.S.C. 154(b) by 0 days.

(21) Appl. No.: 15/380,695

(22) Filed: Dec. 15, 2016

(65) Prior Publication Data

US 2017/0099344 A1    Apr. 6, 2017

Related U.S. Application Data

(63) Continuation-in-part of application No. 15/251,892, filed on Aug. 30, 2016, and a continuation-in-part of application No. 14/829,523, filed on Aug. 18, 2015, which is a continuation of application No. 13/803,231, filed on Mar. 14, 2013, now Pat. No. 9,170,990, application No. 15/380,695, which is a continuation-in-part of application No. 13/962,096, filed on Aug. 8, 2013, and a continuation-in-part of application No. 13/333,605, filed on Dec. 21, 2011, which is a continuation-in-part of application No. 13/155,900, filed on Jun. 8, 2011, now abandoned.

(60) Provisional application No. 62/267,569, filed on Dec. 15, 2015, provisional application No. 62/213,611, filed on Sep. 2, 2015, provisional application No. 62/211,848, filed on Aug. 30, 2015, provisional application No. 61/858,154, filed on Jul. 25, 2013,
(Continued)

(51) Int. Cl.
```
G06F 17/20    (2006.01)
H04L 29/08    (2006.01)
G06F 21/62    (2013.01)
H04L 29/06    (2006.01)
G06F 16/182   (2019.01)
```

(52) U.S. Cl.
CPC .......... H04L 67/06 (2013.01); G06F 16/182 (2019.01); G06F 21/6236 (2013.01); H04L 63/10 (2013.01); H04L 63/20 (2013.01); H04L 67/02 (2013.01); H04L 67/1097 (2013.01)

(58) Field of Classification Search
CPC ......... H04L 67/02; H04L 67/06; H04L 67/10; H04L 67/42
USPC ........................................................ 715/256
See application file for complete search history.

(56) References Cited

U.S. PATENT DOCUMENTS

| | | |
|---|---|---|
| 4,479,195 A | 10/1984 | Herr et al. |
| 4,949,300 A | 8/1990 | Christenson et al. |
| 5,008,853 A | 4/1991 | Bly et al. |

(Continued)

OTHER PUBLICATIONS

Jain, "The Class of Java", Aug. 23, 2010, published by Pearson India, original edition, excerpt pp. 1-15.*

(Continued)

*Primary Examiner* — Keith D Bloomquist
(74) *Attorney, Agent, or Firm* — Finnegan, Henderson, Farabow, Garrett & Dunner LLP

(57) ABSTRACT

This invention discloses a novel system and method for automatically managing the movement of document files from a first document storage sub-system to a second document storage sub-system, tracking such movement and applying security policies before the movement is completed.

27 Claims, 7 Drawing Sheets

Related U.S. Application Data provisional application No. 61/559,227, filed on Nov. 14, 2011.

(56) References Cited

U.S. PATENT DOCUMENTS

| | | | |
|---|---|---|---|
| 5,072,412 A | 12/1991 | Henderson, Jr. et al. | |
| 5,220,657 A | 6/1993 | Bly et al. | |
| 5,245,553 A | 9/1993 | Tanenbaum | |
| 5,247,615 A | 9/1993 | Mori et al. | |
| 5,293,619 A | 3/1994 | Dean | |
| 5,379,374 A | 1/1995 | Ishizaki et al. | |
| 5,446,842 A | 8/1995 | Schaeffer et al. | |
| 5,608,872 A | 3/1997 | Schwartz et al. | |
| 5,617,539 A | 4/1997 | Ludwig et al. | |
| 5,619,649 A | 4/1997 | Kovnat et al. | |
| 5,634,062 A | 5/1997 | Shimizu et al. | |
| 5,671,428 A | 9/1997 | Muranaga et al. | |
| 5,699,427 A | 12/1997 | Chow et al. | |
| RE35,861 E | 7/1998 | Queen | |
| 5,787,175 A | 7/1998 | Carter | |
| 5,787,444 A | 7/1998 | Gerken et al. | |
| 5,801,702 A | 9/1998 | Dolan et al. | |
| 5,806,078 A | 9/1998 | Hug et al. | |
| 5,819,300 A | 10/1998 | Kohno et al. | |
| 5,832,494 A | 11/1998 | Egger et al. | |
| 5,890,177 A | 3/1999 | Moody et al. | |
| 5,897,636 A | 4/1999 | Kaeser | |
| 5,898,836 A | 4/1999 | Freivald et al. | |
| 6,003,060 A | 12/1999 | Aznar et al. | |
| 6,012,087 A | 1/2000 | Freivald et al. | |
| 6,029,175 A | 2/2000 | Chow et al. | |
| 6,038,561 A | 3/2000 | Snyder et al. | |
| 6,049,804 A | 4/2000 | Burgess et al. | |
| 6,067,551 A | 5/2000 | Brown et al. | |
| 6,088,702 A | 7/2000 | Plantz et al. | |
| 6,128,635 A | 10/2000 | Ikeno | |
| 6,145,084 A | 11/2000 | Zuili et al. | |
| 6,189,019 B1 | 2/2001 | Blumer et al. | |
| 6,212,534 B1 | 4/2001 | Lo et al. | |
| 6,219,818 B1 | 4/2001 | Freivald et al. | |
| 6,243,091 B1 | 6/2001 | Berstis | |
| 6,263,350 B1 | 7/2001 | Wollrath et al. | |
| 6,263,364 B1 | 7/2001 | Najork et al. | |
| 6,269,370 B1 | 7/2001 | Kirsch | |
| 6,285,999 B1 | 9/2001 | Page | |
| 6,301,368 B1 | 10/2001 | Bolle et al. | |
| 6,317,777 B1 | 11/2001 | Skarbo et al. | |
| 6,321,265 B1 | 11/2001 | Najork et al. | |
| 6,327,611 B1 | 12/2001 | Everingham | |
| 6,336,123 B2 | 1/2002 | Inoue et al. | |
| 6,351,755 B1 | 2/2002 | Najork et al. | |
| 6,356,937 B1 | 3/2002 | Montville et al. | |
| 6,377,984 B1 | 4/2002 | Najork et al. | |
| 6,404,446 B1 | 6/2002 | Bates et al. | |
| 6,418,433 B1 | 7/2002 | Chakrabarti et al. | |
| 6,418,453 B1 | 7/2002 | Kraft et al. | |
| 6,424,966 B1 | 7/2002 | Meyerzon et al. | |
| 6,449,624 B1 | 9/2002 | Hammack et al. | |
| 6,505,237 B2 | 1/2003 | Beyda et al. | |
| 6,513,050 B1 | 1/2003 | Williams et al. | |
| 6,547,829 B1 | 4/2003 | Meyerzon et al. | |
| 6,556,982 B1 | 4/2003 | McGaffey et al. | |
| 6,560,620 B1 | 5/2003 | Ching | |
| 6,584,466 B1 | 6/2003 | Serbinis et al. | |
| 6,591,289 B1 | 7/2003 | Britton | |
| 6,594,662 B1 | 7/2003 | Sieffert et al. | |
| 6,596,030 B2 | 7/2003 | Ball et al. | |
| 6,614,789 B1 | 9/2003 | Yazdani et al. | |
| 6,658,626 B1 | 12/2003 | Aiken | |
| 6,662,212 B1 | 12/2003 | Chandhok et al. | |
| 6,738,762 B1 | 5/2004 | Chen et al. | |
| 6,745,024 B1 | 6/2004 | DeJaco et al. | |
| 6,832,202 B1 | 12/2004 | Schuyler et al. | |
| 6,918,082 B1 | 7/2005 | Gross | |
| 7,035,427 B2 | 4/2006 | Rhoads | |
| 7,085,735 B1 | 8/2006 | Hall et al. | |
| 7,107,518 B2 | 9/2006 | Ramaley et al. | |
| 7,113,615 B2 | 9/2006 | Rhoads et al. | |
| 7,152,019 B2 | 12/2006 | Tarantola et al. | |
| 7,155,737 B1 * | 12/2006 | Lim | G06F 21/33 726/2 |
| 7,181,492 B2 | 2/2007 | Wen et al. | |
| 7,194,761 B1 | 3/2007 | Champagne | |
| 7,212,955 B2 | 5/2007 | Kirshenbaum et al. | |
| 7,233,686 B2 | 6/2007 | Hamid | |
| 7,240,207 B2 | 7/2007 | Weare | |
| 7,299,504 B1 | 11/2007 | Tiller et al. | |
| 7,321,864 B1 | 1/2008 | Gendler | |
| 7,356,704 B2 | 4/2008 | Rinkevich et al. | |
| 7,434,164 B2 | 10/2008 | Salesin et al. | |
| 7,454,778 B2 | 11/2008 | Pearson et al. | |
| 7,496,841 B2 | 2/2009 | Hadfield et al. | |
| 7,564,997 B2 | 7/2009 | Hamid | |
| 7,613,770 B2 | 11/2009 | Li | |
| 7,624,447 B1 | 11/2009 | Horowitz et al. | |
| 7,627,613 B1 | 12/2009 | Dulitz et al. | |
| 7,673,324 B2 | 3/2010 | Tirosh et al. | |
| 7,680,785 B2 | 3/2010 | Najork | |
| 7,685,298 B2 | 3/2010 | Day | |
| 7,694,336 B2 | 4/2010 | Rinkevich et al. | |
| 7,707,153 B1 | 4/2010 | Petito et al. | |
| 7,720,256 B2 | 5/2010 | Desprez et al. | |
| 7,730,175 B1 | 6/2010 | Roesch et al. | |
| 7,788,235 B1 | 8/2010 | Yeo | |
| 7,796,309 B2 | 9/2010 | Sadovsky et al. | |
| 7,797,724 B2 | 9/2010 | Calvin | |
| 7,818,678 B2 | 10/2010 | Massand | |
| 7,844,116 B2 | 11/2010 | Monga | |
| 7,857,201 B2 | 12/2010 | Silverbrook et al. | |
| 7,877,790 B2 | 1/2011 | Vishik et al. | |
| 7,890,752 B2 | 2/2011 | Bardsley et al. | |
| 7,903,822 B1 | 3/2011 | Hair et al. | |
| 7,941,844 B2 | 5/2011 | Anno | |
| 7,958,101 B1 | 6/2011 | Teugels et al. | |
| 8,005,277 B2 | 8/2011 | Tulyakov et al. | |
| 8,042,112 B1 | 10/2011 | Zhu et al. | |
| 8,117,225 B1 | 2/2012 | Zilka | |
| 8,145,724 B1 | 3/2012 | Hawks et al. | |
| 8,181,036 B1 | 5/2012 | Nachenberg | |
| 8,196,030 B1 | 6/2012 | Wang et al. | |
| 8,201,254 B1 | 6/2012 | Wilhelm et al. | |
| 8,233,723 B2 | 7/2012 | Sundaresan | |
| 8,286,085 B1 | 10/2012 | Denise | |
| 8,286,171 B2 | 10/2012 | More et al. | |
| 8,301,994 B1 | 10/2012 | Shah | |
| 8,316,237 B1 | 11/2012 | Felsher et al. | |
| 8,406,456 B2 | 3/2013 | More | |
| 8,473,847 B2 | 6/2013 | Glover | |
| 8,478,995 B2 | 7/2013 | Alculumbre | |
| 8,555,080 B2 | 10/2013 | More et al. | |
| 8,572,388 B2 | 10/2013 | Boemker et al. | |
| 8,620,872 B1 | 12/2013 | Killalea | |
| 8,635,295 B2 | 1/2014 | Mulder | |
| 8,732,127 B1 | 5/2014 | Rotterdam et al. | |
| 8,776,190 B1 | 7/2014 | Cavage et al. | |
| 8,797,603 B1 | 8/2014 | Dougherty et al. | |
| 8,839,100 B1 | 9/2014 | Donald | |
| 9,098,500 B1 | 8/2015 | Asokan et al. | |
| 9,311,624 B2 | 4/2016 | Diament et al. | |
| 9,652,485 B1 | 5/2017 | Bhargava et al. | |
| 2001/0018739 A1 | 8/2001 | Anderson et al. | |
| 2001/0042073 A1 | 11/2001 | Saether et al. | |
| 2002/0010682 A1 | 1/2002 | Johnson | |
| 2002/0016959 A1 | 2/2002 | Barton et al. | |
| 2002/0019827 A1 | 2/2002 | Shiman et al. | |
| 2002/0023158 A1 | 2/2002 | Polizzi et al. | |
| 2002/0052928 A1 | 5/2002 | Stern et al. | |
| 2002/0063154 A1 | 5/2002 | Hoyos et al. | |
| 2002/0065827 A1 | 5/2002 | Christie et al. | |
| 2002/0065848 A1 | 5/2002 | Walker et al. | |
| 2002/0073188 A1 | 6/2002 | Rawson, III | |
| 2002/0087515 A1 | 7/2002 | Swannack et al. | |
| 2002/0099602 A1 | 7/2002 | Moskowitz et al. | |
| 2002/0120648 A1 | 8/2002 | Ball et al. | |

(56) References Cited

U.S. PATENT DOCUMENTS

| | | |
|---|---|---|
| 2002/0129062 A1 | 9/2002 | Luparello |
| 2002/0136222 A1 | 9/2002 | Robohm |
| 2002/0138744 A1 | 9/2002 | Schleicher et al. |
| 2002/0159239 A1 | 10/2002 | Amie et al. |
| 2002/0164058 A1 | 11/2002 | Aggarwal et al. |
| 2003/0009518 A1 | 1/2003 | Harrow et al. |
| 2003/0009528 A1 | 1/2003 | Sharif et al. |
| 2003/0037010 A1 | 2/2003 | Schmelzer |
| 2003/0046572 A1 | 3/2003 | Newman et al. |
| 2003/0051054 A1 | 3/2003 | Redlich et al. |
| 2003/0061260 A1 | 3/2003 | Rajkumar |
| 2003/0061350 A1 | 3/2003 | Masuoka et al. |
| 2003/0078880 A1 | 4/2003 | Alley et al. |
| 2003/0084279 A1 | 5/2003 | Campagna |
| 2003/0093755 A1 | 5/2003 | Ramakrishnan |
| 2003/0097454 A1 | 5/2003 | Yamakawa et al. |
| 2003/0112273 A1 | 6/2003 | Hadfield |
| 2003/0115273 A1 | 6/2003 | Delia et al. |
| 2003/0131005 A1 | 7/2003 | Berry |
| 2003/0147267 A1 | 8/2003 | Huttunen |
| 2003/0158839 A1 | 8/2003 | Faybishenko et al. |
| 2003/0191799 A1 | 10/2003 | Araujo et al. |
| 2003/0196087 A1 | 10/2003 | Stringer et al. |
| 2003/0223624 A1 | 12/2003 | Hamid |
| 2003/0233419 A1 | 12/2003 | Beringer |
| 2003/0237047 A1 | 12/2003 | Borson |
| 2004/0002049 A1 | 1/2004 | Beavers et al. |
| 2004/0031052 A1 | 2/2004 | Wannamaker et al. |
| 2004/0098347 A1* | 5/2004 | Atkinson ............ G06F 21/10 705/59 |
| 2004/0122659 A1 | 6/2004 | Hourihane et al. |
| 2004/0128321 A1 | 7/2004 | Hamer |
| 2004/0148567 A1 | 7/2004 | Jeon et al. |
| 2004/0186851 A1 | 9/2004 | Jhingan et al. |
| 2004/0187076 A1 | 9/2004 | Ki |
| 2004/0225645 A1 | 11/2004 | Rowney et al. |
| 2004/0261016 A1 | 12/2004 | Glass et al. |
| 2005/0015707 A1* | 1/2005 | Ji ....................... G06F 21/10 715/234 |
| 2005/0021980 A1 | 1/2005 | Kanai |
| 2005/0038893 A1 | 2/2005 | Graham |
| 2005/0055306 A1 | 3/2005 | Miller et al. |
| 2005/0055337 A1 | 3/2005 | Bebo et al. |
| 2005/0071755 A1 | 3/2005 | Harrington et al. |
| 2005/0108293 A1 | 5/2005 | Lipman et al. |
| 2005/0138350 A1 | 6/2005 | Hariharan |
| 2005/0138540 A1 | 6/2005 | Baltus et al. |
| 2005/0204008 A1 | 9/2005 | Shinbrood |
| 2005/0251738 A1 | 11/2005 | Hirano et al. |
| 2005/0251748 A1 | 11/2005 | Gusmorino et al. |
| 2005/0256893 A1 | 11/2005 | Perry |
| 2005/0268327 A1 | 12/2005 | Starikov |
| 2005/0278421 A1* | 12/2005 | Simpson ............ H04L 29/06 709/203 |
| 2006/0005247 A1 | 1/2006 | Zhang et al. |
| 2006/0013393 A1 | 1/2006 | Ferchichi et al. |
| 2006/0021031 A1 | 1/2006 | Leahy et al. |
| 2006/0047765 A1 | 3/2006 | Mizoi et al. |
| 2006/0050937 A1 | 3/2006 | Hamid |
| 2006/0059196 A1 | 3/2006 | Sato et al. |
| 2006/0064717 A1 | 3/2006 | Shibata et al. |
| 2006/0067578 A1 | 3/2006 | Fuse |
| 2006/0069740 A1 | 3/2006 | Ando |
| 2006/0075041 A1 | 4/2006 | Antonoff et al. |
| 2006/0098850 A1 | 5/2006 | Hamid |
| 2006/0112120 A1 | 5/2006 | Rohall |
| 2006/0129627 A1 | 6/2006 | Phillips |
| 2006/0158676 A1 | 7/2006 | Hamada |
| 2006/0171588 A1 | 8/2006 | Chellapilla et al. |
| 2006/0184505 A1 | 8/2006 | Kedem |
| 2006/0190493 A1 | 8/2006 | Kawai et al. |
| 2006/0218004 A1 | 9/2006 | Dworkin et al. |
| 2006/0218643 A1 | 9/2006 | DeYoung |
| 2006/0224589 A1 | 10/2006 | Rowney |
| 2006/0236246 A1 | 10/2006 | Bono et al. |
| 2006/0261112 A1 | 11/2006 | Todd et al. |
| 2006/0271947 A1 | 11/2006 | Lienhart et al. |
| 2006/0272024 A1 | 11/2006 | Huang et al. |
| 2006/0277229 A1 | 12/2006 | Yoshida et al. |
| 2006/0294468 A1 | 12/2006 | Sareen et al. |
| 2006/0294469 A1 | 12/2006 | Sareen et al. |
| 2007/0005589 A1 | 1/2007 | Gollapudi |
| 2007/0011211 A1 | 1/2007 | Reeves et al. |
| 2007/0025265 A1 | 2/2007 | Porras et al. |
| 2007/0027830 A1 | 2/2007 | Simons et al. |
| 2007/0038704 A1 | 2/2007 | Brown et al. |
| 2007/0094510 A1 | 4/2007 | Ross et al. |
| 2007/0100991 A1 | 5/2007 | Daniels et al. |
| 2007/0101154 A1 | 5/2007 | Bardsley et al. |
| 2007/0101413 A1 | 5/2007 | Vishik et al. |
| 2007/0112930 A1 | 5/2007 | Foo et al. |
| 2007/0150443 A1 | 6/2007 | Bergholz et al. |
| 2007/0174766 A1 | 7/2007 | Rubin et al. |
| 2007/0179967 A1 | 8/2007 | Zhang |
| 2007/0192728 A1 | 8/2007 | Finley et al. |
| 2007/0220061 A1 | 9/2007 | Tirosh et al. |
| 2007/0220068 A1 | 9/2007 | Thompson et al. |
| 2007/0253608 A1 | 11/2007 | Tulyakov et al. |
| 2007/0261099 A1 | 11/2007 | Broussard et al. |
| 2007/0261112 A1 | 11/2007 | Todd et al. |
| 2007/0294318 A1 | 12/2007 | Arora et al. |
| 2007/0294612 A1 | 12/2007 | Drucker et al. |
| 2007/0299880 A1 | 12/2007 | Kawabe et al. |
| 2008/0022003 A1 | 1/2008 | Alve |
| 2008/0028017 A1 | 1/2008 | Garbow et al. |
| 2008/0033913 A1 | 2/2008 | Winburn |
| 2008/0034282 A1 | 2/2008 | Zernik |
| 2008/0034327 A1 | 2/2008 | Cisler et al. |
| 2008/0065668 A1 | 3/2008 | Spence et al. |
| 2008/0080515 A1 | 4/2008 | Tombroff et al. |
| 2008/0082529 A1 | 4/2008 | Mantena et al. |
| 2008/0091465 A1 | 4/2008 | Fuschino et al. |
| 2008/0091735 A1 | 4/2008 | Fukushima et al. |
| 2008/0162527 A1 | 7/2008 | Pizano et al. |
| 2008/0177782 A1 | 7/2008 | Poston et al. |
| 2008/0209001 A1 | 8/2008 | Boyle et al. |
| 2008/0215667 A1 | 9/2008 | Rothbarth et al. |
| 2008/0219495 A1 | 9/2008 | Hulten et al. |
| 2008/0235760 A1 | 9/2008 | Broussard et al. |
| 2008/0263363 A1 | 10/2008 | Jueneman et al. |
| 2008/0275694 A1 | 11/2008 | Varone |
| 2008/0288597 A1 | 11/2008 | Christensen et al. |
| 2008/0301193 A1 | 12/2008 | Massand |
| 2008/0306894 A1 | 12/2008 | Rajkumar et al. |
| 2008/0310624 A1 | 12/2008 | Celikkan |
| 2008/0320316 A1 | 12/2008 | Waldspurger et al. |
| 2009/0025087 A1 | 1/2009 | Peirson et al. |
| 2009/0030997 A1 | 1/2009 | Malik |
| 2009/0034804 A1 | 2/2009 | Cho et al. |
| 2009/0049132 A1 | 2/2009 | Gutovski |
| 2009/0052778 A1 | 2/2009 | Edgecomb et al. |
| 2009/0064326 A1 | 3/2009 | Goldstein |
| 2009/0083073 A1 | 3/2009 | Mehta et al. |
| 2009/0083384 A1 | 3/2009 | Bhogal et al. |
| 2009/0129002 A1 | 5/2009 | Wu et al. |
| 2009/0164427 A1 | 6/2009 | Shields et al. |
| 2009/0177754 A1 | 7/2009 | Brezina et al. |
| 2009/0183257 A1 | 7/2009 | Prahalad |
| 2009/0187567 A1 | 7/2009 | Rolle |
| 2009/0216843 A1 | 8/2009 | Willner et al. |
| 2009/0222450 A1 | 9/2009 | Zigelman |
| 2009/0234863 A1 | 9/2009 | Evans |
| 2009/0241187 A1 | 9/2009 | Troyansky |
| 2009/0271620 A1 | 10/2009 | Sudhakar |
| 2009/0319480 A1 | 12/2009 | Saito |
| 2010/0011077 A1 | 1/2010 | Shkolnikov et al. |
| 2010/0011428 A1 | 1/2010 | Atwood et al. |
| 2010/0017404 A1 | 1/2010 | Banerjee et al. |
| 2010/0017850 A1 | 1/2010 | More et al. |
| 2010/0049807 A1 | 2/2010 | Thompson |
| 2010/0058053 A1* | 3/2010 | Wood .................. G06F 21/31 713/155 |
| 2010/0064004 A1 | 3/2010 | Ravi et al. |
| 2010/0064372 A1 | 3/2010 | More et al. |

(56) References Cited

U.S. PATENT DOCUMENTS

| | | |
|---|---|---|
| 2010/0070448 A1 | 3/2010 | Omoigui |
| 2010/0076985 A1 | 3/2010 | Egnor |
| 2010/0083230 A1 | 4/2010 | Ramakrishnan |
| 2010/0114985 A1 | 5/2010 | Chaudhary et al. |
| 2010/0114991 A1 | 5/2010 | Chaudhary et al. |
| 2010/0131604 A1 | 5/2010 | Portilla |
| 2010/0146382 A1 | 6/2010 | Abe et al. |
| 2010/0174678 A1 | 7/2010 | Massand |
| 2010/0174761 A1 | 7/2010 | Longobardi et al. |
| 2010/0186062 A1 | 7/2010 | Banti et al. |
| 2010/0217987 A1 | 8/2010 | Shevade |
| 2010/0235763 A1 | 9/2010 | Massand |
| 2010/0241943 A1 | 9/2010 | Massand |
| 2010/0257352 A1 | 10/2010 | Errico |
| 2010/0274765 A1 | 10/2010 | Murphy et al. |
| 2010/0287246 A1 | 11/2010 | Klos et al. |
| 2010/0299727 A1 | 11/2010 | More et al. |
| 2010/0318530 A1 | 12/2010 | Massand |
| 2010/0332428 A1 | 12/2010 | McHenry et al. |
| 2011/0029625 A1 | 2/2011 | Cheng et al. |
| 2011/0035655 A1 | 2/2011 | Heineken |
| 2011/0041165 A1* | 2/2011 | Bowen .................... H04L 63/08 726/5 |
| 2011/0106892 A1 | 5/2011 | Nelson et al. |
| 2011/0107106 A1 | 5/2011 | Morii et al. |
| 2011/0125806 A1 | 5/2011 | Park |
| 2011/0141521 A1 | 6/2011 | Qiao |
| 2011/0145229 A1 | 6/2011 | Vailaya et al. |
| 2011/0197121 A1 | 8/2011 | Kletter |
| 2011/0225646 A1* | 9/2011 | Crawford ............ H04L 63/0236 726/11 |
| 2011/0252098 A1 | 10/2011 | Kumar |
| 2011/0252310 A1 | 10/2011 | Rahaman et al. |
| 2011/0264907 A1* | 10/2011 | Betz .................... H04L 63/0428 713/153 |
| 2011/0314384 A1 | 12/2011 | Lindgren et al. |
| 2012/0011361 A1 | 1/2012 | Guerrero et al. |
| 2012/0016867 A1 | 1/2012 | Clemm et al. |
| 2012/0030563 A1 | 2/2012 | Lemonik et al. |
| 2012/0036157 A1 | 2/2012 | Rolle |
| 2012/0079267 A1 | 3/2012 | Lee |
| 2012/0079596 A1 | 3/2012 | Thomas et al. |
| 2012/0110092 A1 | 5/2012 | Keohane et al. |
| 2012/0117096 A1 | 5/2012 | Massand |
| 2012/0117644 A1* | 5/2012 | Soeder .................. G06F 21/554 726/22 |
| 2012/0131635 A1 | 5/2012 | Huapaya |
| 2012/0133989 A1 | 5/2012 | Glover |
| 2012/0136862 A1 | 5/2012 | Glover |
| 2012/0136951 A1 | 5/2012 | Mulder |
| 2012/0151316 A1 | 6/2012 | Massand |
| 2012/0173881 A1 | 7/2012 | Troller |
| 2012/0185511 A1 | 7/2012 | Mansfield et al. |
| 2012/0246115 A1 | 9/2012 | King et al. |
| 2012/0260188 A1 | 10/2012 | Park et al. |
| 2012/0265817 A1 | 10/2012 | Vidalenc et al. |
| 2012/0317239 A1 | 12/2012 | Mulder |
| 2013/0007070 A1 | 1/2013 | Pitschke |
| 2013/0060799 A1 | 3/2013 | Massand |
| 2013/0074195 A1 | 3/2013 | Johnston et al. |
| 2013/0097421 A1 | 4/2013 | Lim |
| 2013/0212707 A1 | 8/2013 | Donahue et al. |
| 2013/0219512 A1* | 8/2013 | Lin .......................... G06F 21/60 726/27 |
| 2013/0227043 A1 | 8/2013 | Murakami |
| 2013/0227397 A1 | 8/2013 | Tvorun |
| 2014/0020050 A1* | 1/2014 | Hoche .................. G06F 21/552 726/1 |
| 2014/0032489 A1 | 1/2014 | Hebbar et al. |
| 2014/0115436 A1 | 4/2014 | Beaver et al. |
| 2014/0136497 A1 | 5/2014 | Georgiev |
| 2014/0181223 A1 | 6/2014 | Homsany et al. |
| 2014/0280336 A1 | 9/2014 | Glover |
| 2014/0281872 A1 | 9/2014 | Glover |
| 2015/0026464 A1 | 1/2015 | Hanner et al. |
| 2015/0172058 A1 | 6/2015 | Follis |
| 2016/0350270 A1 | 12/2016 | Nakazawa |

OTHER PUBLICATIONS

Classification Definitions, Data Processing: Presentation Processing of Document, Operator Interface Processing, and Screen Saver Display Processing; Feb. 2011; pp. 1-33.
Final office action dated Aug. 15, 2012 for U.S. Appl. No. 11/336,329 which published as U.S. Pub. No. 2007/0174766 for "Hidden document data removal" to Rubin et. al.
Greg Shultz. article "Keep Microsoft Office Documents Clean with iScrub," published by TechRepublic.com on Jul. 9, 2003.
Mike Heck. Keep Sensitive Data Out of E-Mails. InfoWorld.com. Apr. 24, 2006.
Workshare Ltd. Workshare Protect 4.5 Admin Guide, (c) 2006.
Workshare Ltd. Workshare Protect 4.5 User Guide, (c) 2006.
Jain, Pravin. The class of JAVA. Aug. 12, 2010.
Bettenburg et al., An Empirical Study on the Risks of Using Off-the-Shelf Techniques for Processing Mailing List Data, 2009, IEEE 4 pages.
Bindu et al., Spam War: Battling Ham against Spam, 2011 IEEE 6 pages.
Bobba et al. Attribute-Based Messaging: Access Control and Confidentiality, 2010, ACM 35 pages.
Chen et al., Online Detection and Prevention of Phishing Attacks, 2006, IEEE 7 pages.
Kamouskos et al., Active Electronic Mail, 2002, ACM 6 pages.
Kaushik et al., Email Feedback: A Policy based Approach to Overcoming False Positives, 2005, 10 pages.
Stolfo et al., AMT?MET: Systems for Modeling and Detecting Errant Email. 2003, IEEE 6 pages.

* cited by examiner

SYSTEM AND METHOD FOR CROSS PLATFORM DOCUMENT SHARING

PRIORITY CLAIM

This utility application claims priority as a non-provisional application of U.S. Pat. App. No. 62/267,569, filed on Dec. 15, 2015; as a continuation-in-part of U.S. patent application Ser. No. 15/251,892, filed on Aug. 30, 2016 which is a non-provisional application of U.S. Pat. App. No. 62/213,611 filed on Sep. 2, 2015 and is a non-provisional application of U.S. Pat. App. No. 62/211,848 filed on Aug. 30, 2015; as a continuation-in-part to U.S. patent application Ser. No. 14/829,523 filed on Aug. 18, 2015, which is a continuation of U.S. patent application Ser. No. 13/803,231, filed on Mar. 14, 2013, now U.S. Pat. No. 9,170,990, issued on Oct. 27, 2015; as a continuation-in-part to U.S. patent application Ser. No. 13/962,096 filed on Aug. 8, 2013, which is a non-provisional of U.S. Pat. App. No. 61/858,154 filed on Jul. 25, 2013; and as a continuation-in-part to U.S. patent application Ser. No. 13/333,605, filed on Dec. 21, 2011, which is a non-provisional of U.S. Pat. App. No. 61/559,227, filed on Nov. 14, 2011 and a continuation-in-part of U.S. patent application Ser. No. 13/155,900, filed on Jun. 8, 2011, all of which are hereby incorporated by reference in their entireties for all that they teach.

FIELD OF INVENTION

The present invention generally relates to the field of document data file management, data security applied to such data files and data file communication by and among computer systems. In one embodiment, the invention operates on a system comprised of at least one local computer operated by a user, a server system operating the Workshare server and at least one server operating a corresponding third party Saas document sharing platform, whereby the local computer and the servers are in communication using a data network.

BACKGROUND

In the past most document sharing was done via email but in recent years' users have seen the benefits derived from sharing documents in online shared containers and sought to have content being synchronized between these containers and their own computers and mobile devices. This market shift has led to a large number of File Sharing, File Synchronization and Collaboration systems designed to make collaboration easier and for files to be synchronized to wherever a user might want to consume them. The fact that there is not one dominant vendor or technology in this space, but a large number of different vendors and different technological platforms has lead to a number of problems when two organizations that use two different solutions wish to communicate or share documents. They end up relying on inferior technology that both organizations happen to have available—not the platforms that they use internally. This introduces inconveniences like lost document versions, version conflicts, vulnerabilities to security and the like. Therefore, there is a need for a computer system and method of operating computer systems that is an agnostic and consolidated technical solution for document storage, sharing and communication that provides productivity gains for users, and control and risk reduction for organizations by permitting such uses across multiple platforms. The problem of multiple document sharing platforms can be considered from four perspectives:

Content Producer: The modern information professional (someone who produces documents for a living) is being faced with an ever increasing number of SaaS (Software as a Service) based (cloud) systems for storing and sharing documents. These systems include onsite or cloud based enterprise collaboration applications, traditional secure document repositories, home grown Intranet sites and an ever increasing number of modern cloud based SaaS file sharing systems. In a professional service context, often the choice of which system to use is not governed by the content producer, but by his client (the content consumer). As a result, users are required to work across many of these systems on a daily basis.

Content Consumer: From the client's (i.e. the content consumer) perspective, the problem is the same. Unless they are able to mandate that all their content producing counterparts use the same system as they do for file sharing and collaboration (which is unlikely) they are faced with the same dilemma. This example is well illustrated by the challenges corporate counsels face when dealing with multiple law firms and multiple stakeholders internal to the organization. Getting everyone to use the same document storage, sharing management and transmission system is often an impossibility. As a result of the administrative burden this imposes, typically users revert to the lowest common denominator—email with attachments.

Information Governance perspective: The situation above is a nightmare for those charged with data loss prevention and ensuring that information access policy is adhered to. For example, an organization might have a policy that no hidden information found inside documents (for example, metadata) should accidently leave the organization. This organization might have taken measures to ensure this level of protection over files being exchanged in email, but has an ever increasing gaping hole when it comes to SaaS based file sharing systems (which due to their simplicity and mass adoption are often the client's choice). Additionally, the organization (either of the content producers or content consumers) might have invested in an Enterprise Content Management system. In this case, the organizational goal will be to ensure that all content is stored in their chosen ECM/DMS system instead of being distributed in an ever increasing number of external systems.

Market perspective: The number of Enterprise File Sharing Systems is increasing rapidly. The market research firm Gartner Group tracked about 170 companies. Dominant incumbent vendors all have offerings competing against new highly funded startuipvendors and there is a plethora of specialist vendors who provide a unique value proposition over and above basic file sharing—product like Workshare's Transact™ are examples of applications that deliver file sharing in a unique way, aligned with the use cases in the markets in which they operate. Different vendors are taking different approaches to compete. Some SaaS vendors have made available their up their proprietary application programming interface protocols (APIs) to position themselves as platforms whereas others have doubled down on their unique proprietary technology to deliver narrow products and services. Prices are being squeezed and as a result, there is a race to the bottom in terms of prices for data storage. There needs to be a way of working across the boundaries around these systems, effortlessly and safely.

DESCRIPTION OF THE FIGURES

The headings provided herein are for convenience only and do not necessarily affect the scope or meaning of the claimed invention. In the drawings, the same reference numbers and any acronyms identify elements or acts with the same or similar structure or functionality for ease of understanding and convenience. To easily identify the discussion of any particular element or act, the most significant digit or digits in a reference number refer to the Figure number in which that element is first introduced (e.g., element 101 is first introduced and discussed with respect to FIG. 1).

DETAILED DESCRIPTION

Various examples of the invention will now be described. The following description provides specific details for a thorough understanding and enabling description of these examples. One skilled in the relevant art will understand, however, that the invention may be practiced without many of these details. Likewise, one skilled in the relevant art will also understand that the invention can include many other features not described in detail herein. Additionally, some well-known structures or functions may not be shown or described in detail below, so as to avoid unnecessarily obscuring the relevant description. The terminology used below is to be interpreted in its broadest reasonable manner, even though it is being used in conjunction with a detailed description of certain specific examples of the invention. Indeed, certain terms may even be emphasized below; however, any terminology intended to be interpreted in any restricted manner will be overtly and specifically defined as such in this Detailed Description section.

Figure 1:
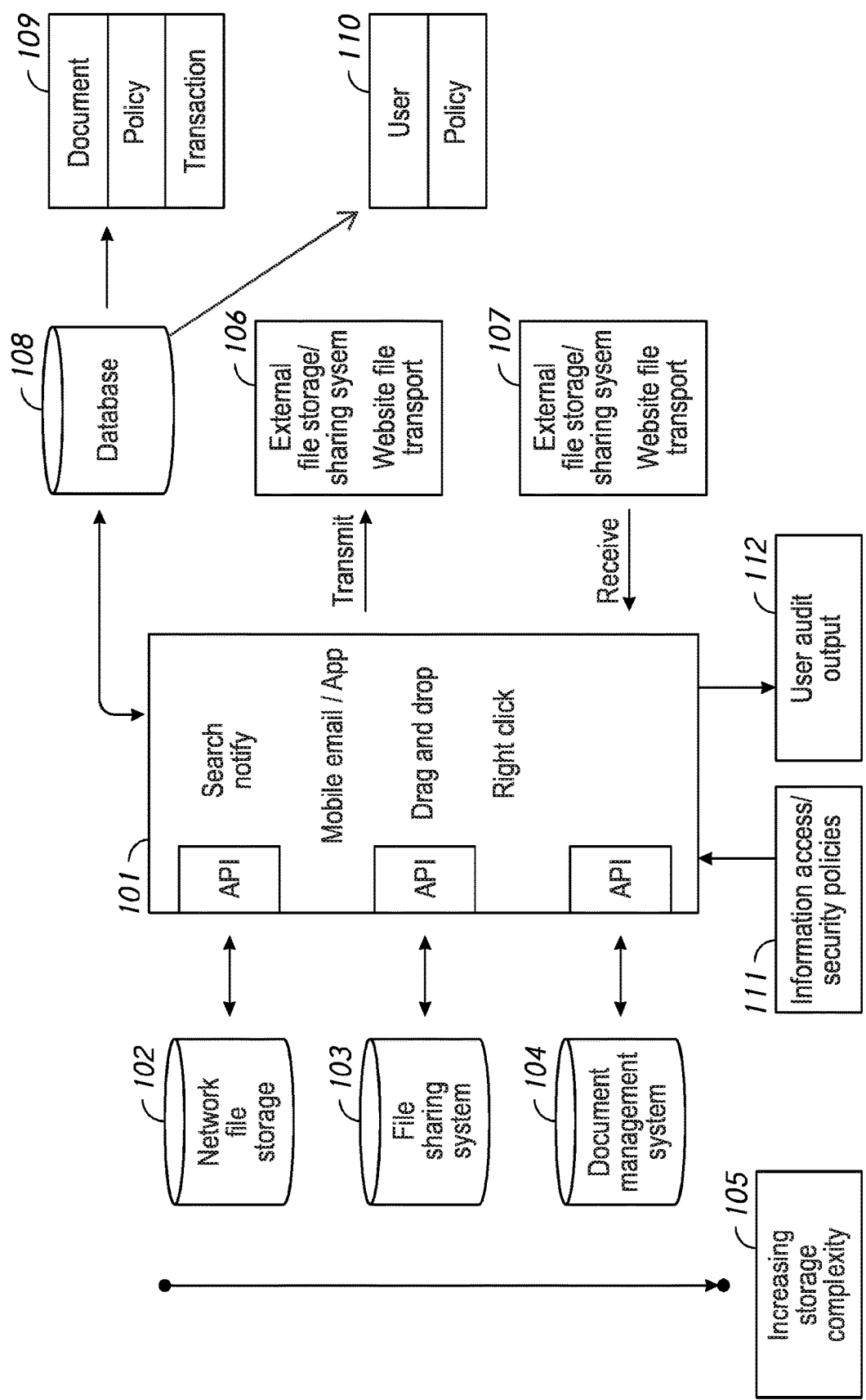
FIG. 1 shows the basic architecture of the invention.

The invention is a computer system and computer operated process that provides an agnostic and consolidated position between all of these other systems to provide productivity gains for users and control and risk reduction for organizations. In one embodiment of the invention, FIG. 1, a system interfaces with each of these other type of document systems and services in order to manage the interaction between them. Referring to FIG. 1, a user of the system embodying the invention, 101, can search or select a file from a variety of locations with increasing complexity. For example, network storage (102), a file sharing SaaS system (103) or a document management system (DMS) (104). The user can then request that the invention route the file to an external location, (106), which may be a external file sharing Saas, transmission by email or even using web services for file transmission. Likewise, the system may receive a file from one of these external data sources (107). That received file may be forwarded on by the invention to any of the data storage locations (102), (103), (104). In the meantime, the movement of the file is transaction data stored in a database accessed by the invention (108). That database (108) in one embodiment stores a data record (109) that corresponds to the document that may include security policy data. In addition, that file may be related to a data record for the user (110). The invention provides the ability to receive security protocols that can be associated with a user (111). Likewise, the database (108) can be used to generate an audit report on use of a file or use of the system by the user (112).

The Benefit to the user:

Regardless of the file sharing systems they use; all files are available to them in a central location. This gives users the advantage of being able to benefit from the value delivered by any of the file sharing systems yet the confidence to know that all their files are easily accessible to them outside of any of those systems Users are able to organize their files as they like yet publish them into the organizational paradigms found in file sharing systems. For example, the user might organize their files and folders by Client, Project and Status whereas the client might organize the file sharing system (which both parties are using) very differently (by department, provider or project milestone). The invention maintains data structures that for a given document, map between these two different ways of organizing files thus making this distinction transparent to the user. The invention uses the mapping so that the user's applicable parameters present a FileOpen dialog where selection of the file is in accordance with the user's preferred organization. When the invention delivers the file to an external destination, the mapping is used by the invention to input the appropriate parameters defining the metadata of the document into the destination context.

Users can easily publish files to a third party system and then re-publish them as they evolve the same way because the invention maintains data structures that for each document track where the document was published. This is very advantageous when one document file might be published to more than one document sharing system because the invention automatically updates all systems where a version of a file is being shared.

Users can accurately and quickly understand what is different between documents as they evolve through their versions. In one embodiment, Workshare's™ document comparison software is utilized by the invention to automatically show users exactly what changed between versions of a document file.

Benefits to the organization:

Risk is reduced as all document files that are uploaded to file sharing systems are processed through the system that operates a document policy system which can remove hidden information or block the upload/sharing of files if inappropriate Record all events where files are uploaded (which file, when, by whom and to where). Suspicious activity can then be tracked and reported on. This provides a central location to obtain document use auditing.

Retain information as copies of files uploaded are retained and accessible centrally without having to go into each of the system those files where uploaded to.

To accomplish this product proposition, the system and its operation has to provide several functionalities:

1. A way to participate in the upload and download of files to and from any number of SaaS based file sharing applications that typically are connected over the Internet or some other wide area network, and the files are available by means of a process executed in compliance with the wide area network data transport protocols.

2. A policy based system which inserts itself between such an upload or download
3. Deep integrations into incumbent ECM/DMS systems
4. Most importantly, a user interface which users prefer to use over and above what they get from using a browser to access SaaS based file sharing tools. Key to accomplishing the last task is to not in any way reduce the offering of the SaaS vendor but provide additional functionality and control to the user on top of the experience delivered.

Figure 2:
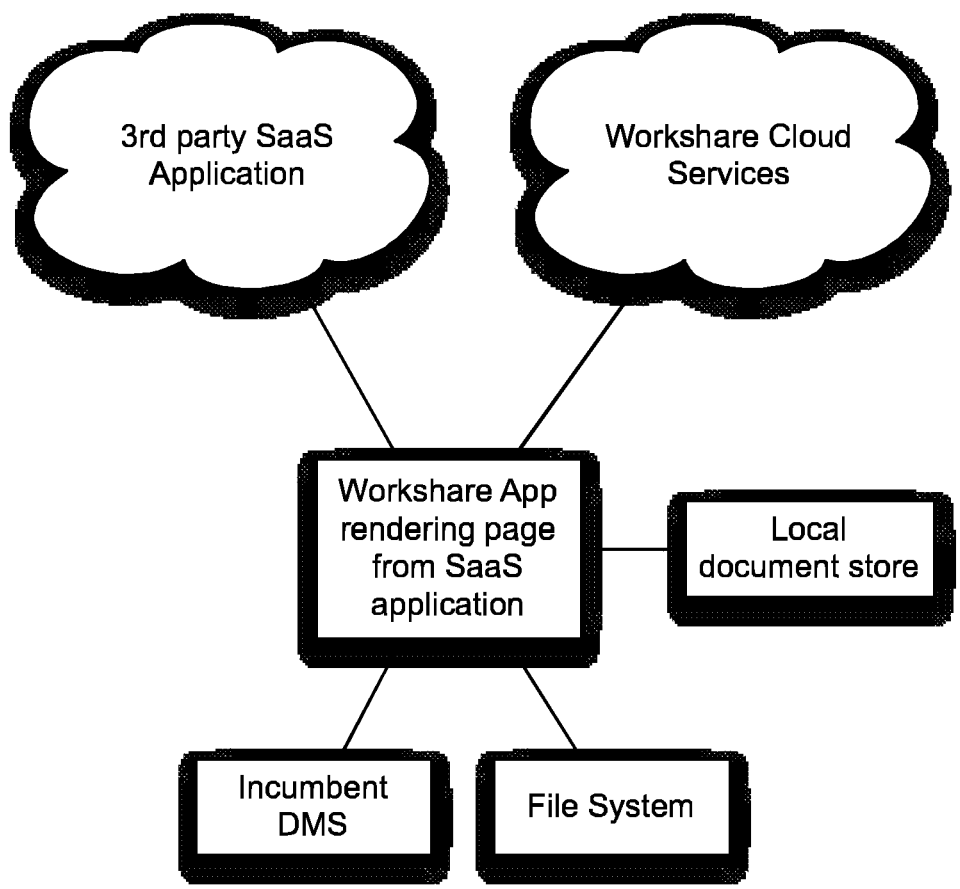
FIG. 2 shows the workflow where a user uploads a file from the document management system to a third party SaaS system.

The invention essentially participates in the upload and download of files from the user's computer (or an incumbent ECM/DMS system the user is using) to one or more SaaS based 3rd party systems or internal systems that the organization uses. By user computer, a desktop, laptop, tablet or smartphone may be used. To accomplish this, the user operates an application that embodies the invention (referred to as the Workshare App) which provides access to 3rd party SaaS application and provides enhanced functionality to upload and download files from the user's computer (or a DMS system the user is using) to and from the 3rd party system or the organization's internal systems. See FIG. 2.

The invention is different than a traditional DMS (document management system) because in one embodiment, the user's computing device accesses data items from a web-accessed server and executes scripts that come down from the server side of the network. Alternative embodiments include a dedicated application operating on the user's device that executes code that is transmitted to the application from the server. Unlike traditional DMS, the embodiments of the invention control the upload of files to cloud storage services in order to apply the various security features described herein. The use of the browser has the added security that the file first traverses the server or computer embodying the invention so that the file may be inspected and its further distribution controlled.

To illustrate how this works, consider the following workflow where a user would like to upload a file from their DMS to a 3rd party SaaS system that operates as a file repository.

In one embodiment, the invention includes the implementation on a user's computer of a Subclass that replaces the browser file handling functions such that javascript (or native HTML) that tries to access files for upload must first pass the request through the subclass code (or code called by the subclass) to select files and additionally run security policy tests on the reference to the selected file as well as the selected file data itself.

In the preferred embodiment the subclass is a plug-in customized for the specific browser program operating on the user's computer. Therefore, in this embodiment, a user will select an install package specific for the browser that operates on their computer. To the extent they operate a browser that does not have the subclass replacement code module, the security function may be impaired. However, it is envisioned that the invention will include a browser cookie function that places a cookie on the user's computer when the subclass component is first installed. Then, when the component is called to check on a file upload, the server side can request the cookie to confirm that the file being uploaded has been accessed using the installed component rather than another browser.

In another embodiment the subclass is installed to work with a program that operates to provide document access across the Internet over HTTP or similar protocols, referred to as an "app." In this case, the app will call for file access, but the additional subclass will trap the request so that the document use policy evaluation may be applied to the request.

The subclass component implements a policy evaluation is applied to each document selection—it is independent of the location that the file originated from, including the DMS where it may be stored. In one embodiment the subclass operating on the user's computer executes the policy testing. In another embodiment, the subclass component calls on server functions to check the file before passing it to its destination.

When prior art DMS is integrated into a word processor application, it runs as a "macro" in that application, typically a word-processing program, the macro being a set of commands that can be interpreted by the application itself. In one example, the file is fetched from the DMS server, and will end up as the opened document in the word processing application. The destination of the file will be the application that has launched the file open. Where the file ends up is not tracked by the DMS, rather, the DMS manages the storage of the document.

The invention implements an additional layer of control over access to the file and is distinct from the traditional DMS implementation in several ways:

1. In the word processing application, for example,—the DMS "file open" dialog on the user interface replaces the existing word processor open dialog by means of the macro functionality in the word processor. In contrast, the invention intercepts the file open, file save, file attach and similar commands that are expressed in the object classes in order that the invention process file access and usage policy as a filtering mechanism between the browser, app or HTTP compatible code and the file dialog code operating on the word processer, email program or other application.
2. In addition, the word processing application (office application) which is running code on the local user's computer device is distinct from the browser which renders HTML/javascript delivered from the server and presents documents as an object displayed in the browser window.
3. When the invention is operating, the browser application operating on the user's computer is not the destination of the opened document—the destination is a server application identified by the URL of the web site being browsed or otherwise accessed by the javascript or other plug-in working with the browser. In contrast, in the word processing application (or other office type application), the destination is the office application itself
4. The browser destination indicator that is both presented to the user (which references an external server location) and used to process security policy for the selected file, forms part of the policy evaluation process. The destination indicator can be stored in a database that associates a user identifier, the destination indicator, other relevant transaction data (e.g. time of day, date) with the document itself, so that the usage of the document and its destination can be systematically accessed to police document usage policies.

Figure 4:
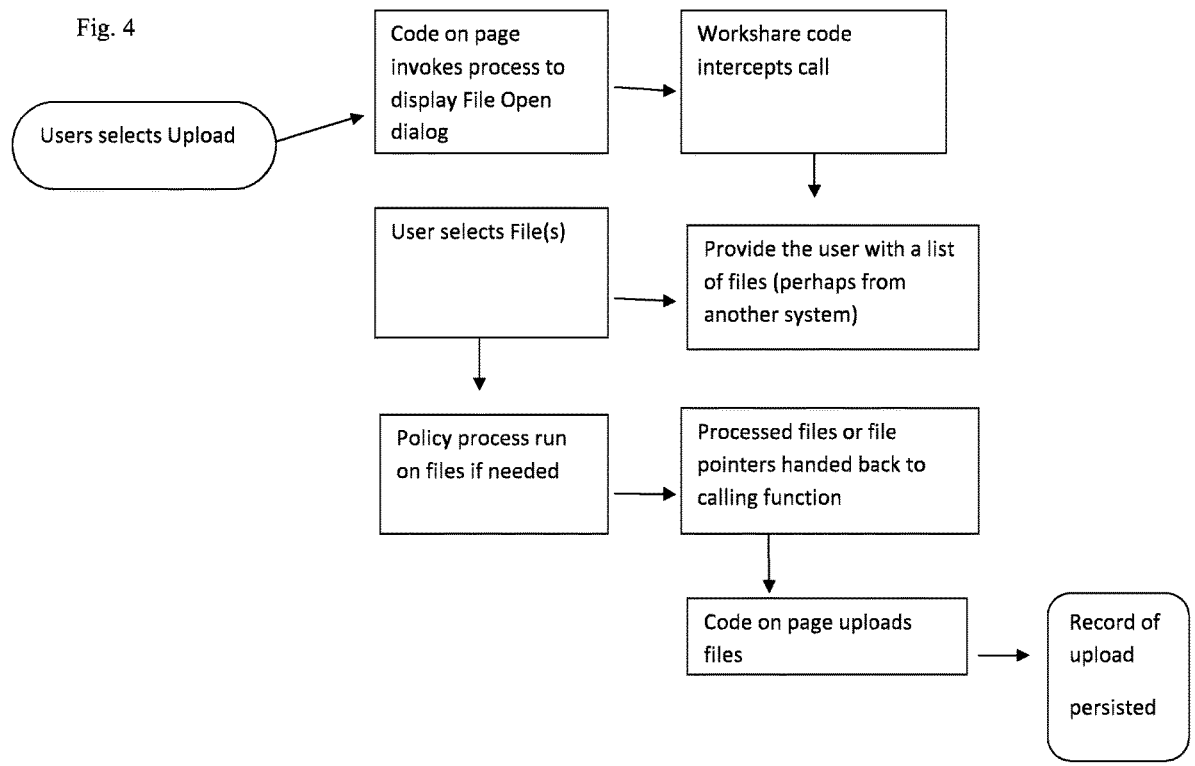
FIG. 4 shows the workflow where the system receives a link to the file from on the third party document management system and the file is transferred to the user's device for editing.

To illustrate how this works, consider the following workflow where a user would like to upload a file from their DMS to a 3rd party, external SaaS system (See FIG. 4):

1. User opens the file access function operating through the browser and navigates to the external cloud storage folder where the file is to be uploaded. This could also be implemented as a browser plugin that implements this functionality within a generic web browser such as Chrome, Firefox, IE, etc. Interacting with the javascript module that performs the upload/download. In an alternative embodiment, an "app" integrates the functionality. An alternative embodiment would integrate the functionality with synchronization or upload apps provided by third party cloud storage companies, where such applications have a method of extensibility that allows code to be run before an upload event to check that the upload is allowed. In such cases the security policy evaluation would be performed by the invention as part of that pre-upload check.

2. User clicks 'Upload' which is a standard Upload button rendered in the page received from the cloud file storage service provider.
3. Instead of being presented with a standard "File Open" dialog, the user is presented with the invention's special File Open dialog which could render any of the following:
   a. A file selector of all known files for the user
   b. A DMS File Open dialog for the user to search for the file they want to upload within the DMS.
   c. A standard File Open dialog to select a file from their file system on their computer device.
4. The user selects the file to upload.
5. Before the file or a pointer to the file is handed to the destination (which in this example is the cloud service provider, that is, before it is handed to the javascript component of the web page of the cloud service provider that will do the file upload), the invention code runs a policy check against the file and performs any policy actions required, which might include:
   a. Converting the file to another format (for example, Word to PDF)
   b. Removing hidden metadata, comments or other confidential information from the file.
   c. Redacting or modifying the file in some way to remove or obscure confidential information.
   d. Blocking the upload based on metadata attributes associated with the file, document content or context derived from the DMS system which prohibits this file from being published or a general policy evaluation/violation. In this step, metadata extracted from the file or associated with the file by means of the DMS is logically tested against policy rules stored in the invention's systems. The result of the logical test then drives the permission level.
   e. Encryption of the file using predetermined keys or a key requested from the user through a dialogue box.
   f. DRM—restricting access rights based on the identity of the receiver or the location of the upload.
   g. Notification to a central authority, for example, by an email transmitted to a person who, according to the security database.
   h. Logging of the upload action, which may include notifications of additional systems that have interest in document location or content (e.g., document genealogy system).
   i. Action could include fingerprint(s) of the document being uploaded.
   j. Actions could also include making subtle changes to the document so that this copy can be identified later (canary trap), or by means of stenography.
   k. Digital signature of the document may be performed as an action.
   l. Variables that may be used as part of policy evaluation logic may include:
      Web site to which the document will be uploaded
      full current URL of the browser performing the upload
      The source document location
      The document metadata
      the document content
      Identity of the user performing the upload
      *IP address, computer name
      Blacklist/whitelist information that may be stored as part of the policy definition
      Previous history of actions by same or other users
   The policy data associated with the document may be updated using any metadata that can be collected in connection with the usage of the document, for example, the destination of the upload, or source of the download, the user, the date, time, the IP address of the local device, an email address of an email object that the document is attached to.
6. After the policy checks are performed, the file (or a pointer to it) is handed to the external SaaS application which then dutifully uploads the file to whichever location it wanted to.
7. The whole transaction may be tracked by the app, so a record of this user uploading this file, at this time, from this source, to this destination can be recorded in both the local database and pushed to a selected cloud software service provider through their services APIs.
   a. This information can be used for subsequent reporting.
   b. Additionally, this information will be stored in order to be used to provide remembered context for the user, so—for example—the invention remembers where files have been published to so any subsequent edits made to the local copy of the same document file can be easily re-published. the user can also override this saved context.

In yet another embodiment of this invention, a custom web browser may be used with a computer system that implements advance file selection dialogs with DMS and policy integration. This may be built using open source code from a typical web browser. An implementation of this strategy using Chromium Extension Framework™ is described in more detail below.

In yet another embodiment of this invention uses customized file selection dialog boxes in the user interface that are integrated into an existing web browser either via a browser add-in or an extension or by customization at a lower level (for instance selectively replacing or modifying the operating system file selection dialogs).

Figure 3:
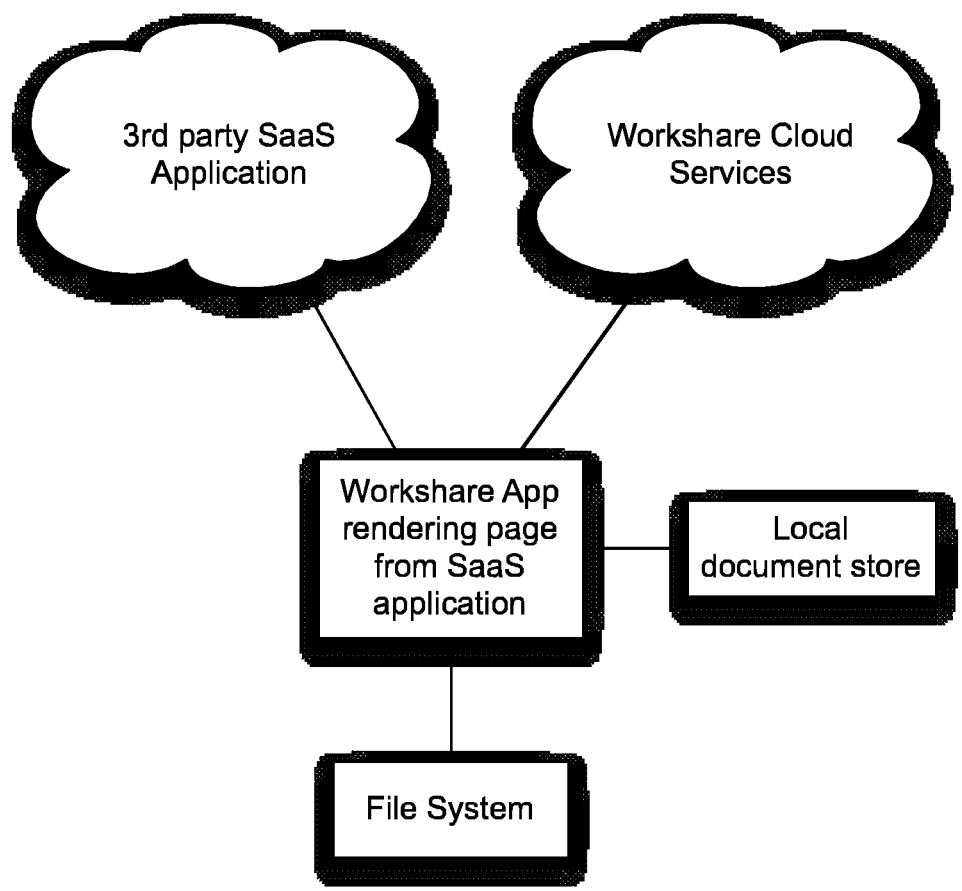
FIG. 3 shows the workflow where a user uploads a file saved from their local computer or from the Workshare system to a third party system.

A further embodiment of the invention would be an application that uses the public APIs of various 3rd party SAAS providers and rendering the information received via those APIs to show a representation of the files and or folders available to the user within the SAAS service. See FIG. 1. The distinction of this embodiment is that the rendering of the available content to the user is not performed by showing web pages originating from the SaaS provider within a web browser or web browser-like program. See FIG. 3.

The data related to an upload event that will be stored in the log or passed on to other systems that record or act due to the upload event may include:
   The identity of the user performing the upload
   The name and source location of the file being uploaded
   The destination that the file is/would be uploaded to
   Relevant document metadata
   Time and date of the upload action Identifying information/location of the computer system used to make the upload such as machine name or IP address Details of the actions that were performed as a result of policy evaluation—e.g., block, redact, clean, file format transformation, etc.

The key to the process outlines above is that because the pages from the 3rd party SaaS application are being contained in the Workshare App, which is able to provide a different File Open and File Save function to which a standard browser rendering the same pages would provide. The SaaS application or other $3^{rd}$ party system is none the wiser—there is no specific integration between the Workshare App and the SaaS provider, it is simply that the JavaScript on the page is delegating the task of providing the file to the browser yet it is the Workshare Apps own implementation of this file selection function that is executed.

The key workflow can be summarized to the following:

1. User initiates an upload process, but instead of the normal web-browser response, Workshare App intercepts to provide the response.

2. User selects the file from whichever source, using a dialog provided by another system (DMS system for example).

3. The Workshare App process runs a security protocol on the file (or files) before passing the file (or its pointer) to the calling application, for example, the web-browser.

One embodiment of the invention is composed of Chromium Extension Framework (CEF) which is an open source version of the Chrome browser. This may be packaged as part of the Workshare App. In one embodiment, the invention is sub-classing CefDialogHandler which is detailed here, which is incorporates by reference the following software documentation:

http://magpcss.org/ceforum/apidocs3/projects/(default)/CefDialogHandler.html
CefDialogHandler is a class used to handle user interface dialog events. The methods of this class will be called on the browser process user interface thread. The class has a method OnFileDialog, depicted below:
public virtual bool OnFileDialog( CefRefPtr< CefBrowser > browser, CefDialogHandler::FileDialogMode mode, const CefString& title, const CefString& default_file_path, const std::vector< CefString >& accept_filters, int selected_accept_filter, CefRefPtr< CefFileDialogCallback > callback );

The method is called to run a file chooser dialog. |mode| represents the type of dialog to display. |title| is the title to be used for the dialog and may be empty to show the default title ("Open" or "Save" depending on the mode). |default_file_path| is the path with optional directory and/or file name component that should be initially selected in the dialog. |accept_filters| are used to restrict the selectable file types and may any combination of (a) valid lower-cased MIME types (e.g. "text/*" or "image/*"), (b) individual file extensions (e.g. ".txt" or ".png"), or (c) combined description and file extension delimited using "|" and ";" (e.g. "Image Types|png;.gif;.jpg"). |selected_accept_filter| is the 0-based index of the filter that should be selected by default. To display a custom dialog, return true and execute |callback| either inline or at a later time. To display the default dialog return false.

Implementing "CefDialogHandler::OnFileDialog" allows the invention to replace the default browser dialogs for "Open File" and "Save File". This function allows the invention to show the Workshare file selector user interface and then return a single, or multiple, absolute local file name(s) that can then be uploaded or accessed in the usual way in the loaded web page or java script.

Figure 5:
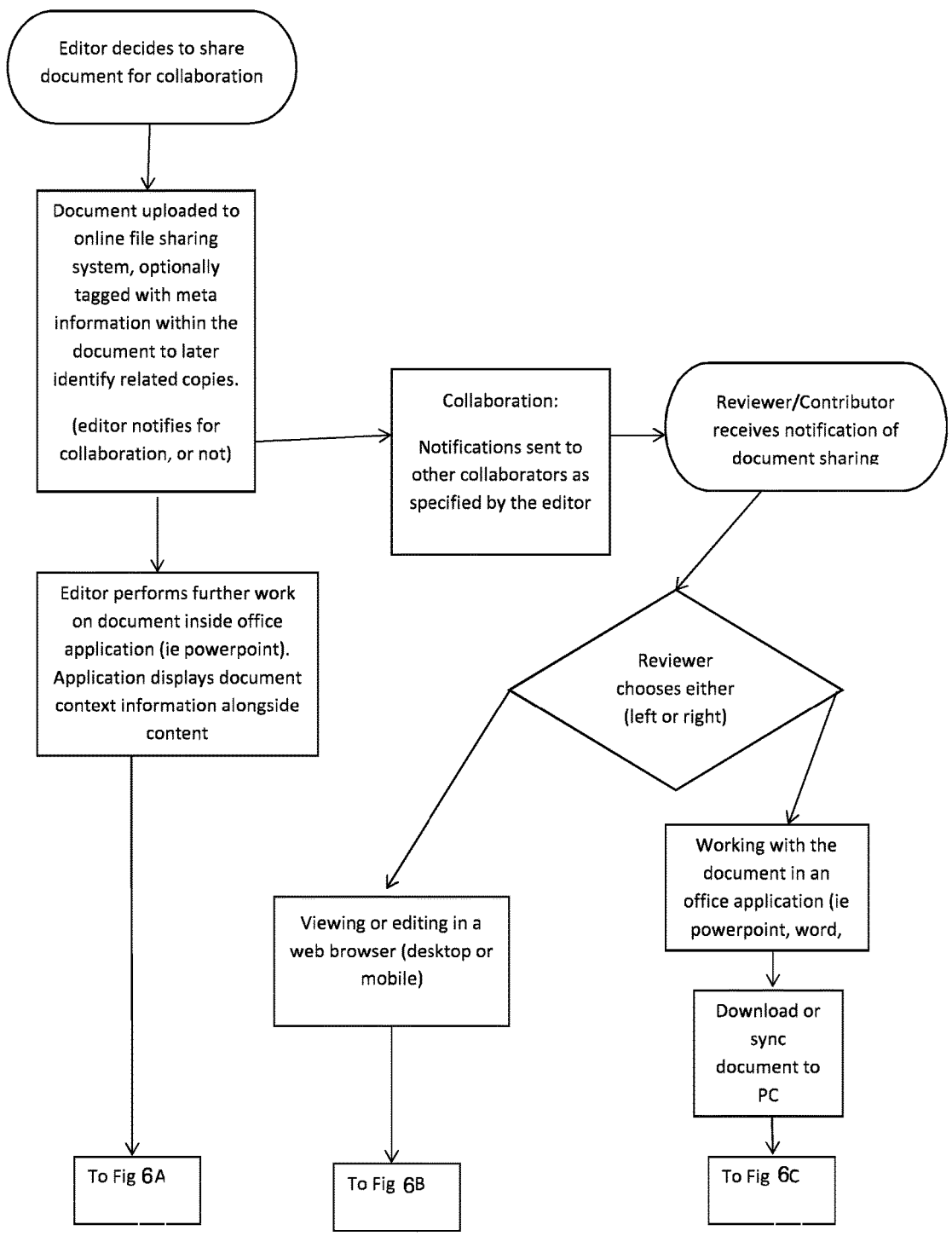
FIG. 5 shows the workflow chart for conducting document collaboration.

1) The preferred implementation of "CefDialogHandler::OnFileDialog" gets called to handle an open file query (e.g. the method is triggered by the user clicking on this html element: <input type="file">). See FIG. 5.

2) For example, if a DMS is installed;
   the application uses a the DovProvider calls to show an "Open File" dialog to select a file from within the DMS.
   the application saves a temporary copy of this file from the DMS to the local file storage on the user computer operating the Workshare App or a central server operating the Workshare App that is being accessed by the user's device.

3) As a further example, the Workshare App is configured for Workshare to supply a list of files
   The system provides a dialog box and protocol to the user to select a file
   The system copies the selected file to a temp location. The key point is that after the user has selected a file (e.g., pressed OK on the dialog), but before the filename/content is passed back to the javascript/main browser code, the policy check will by the system to determine if the upload is allowable and to determine any additional actions to be performed.

4) At this point the invention applies a security policy to this temp local copy.

5) The invention returns from "CefDialogHandler::OnFileDialog" the absolute local file name of this temp copy. In the case that the file needs to be modified as a result of the actions specified by policy, the modified copy of the file will be stored as a local temporary file and that will be the file that is given to the main browser javascript/code.

6) At this point execution has returned to the web page/JavaScript which can now process the temp file as though it was manually selected from the local file store in the first place.

Figure 6:
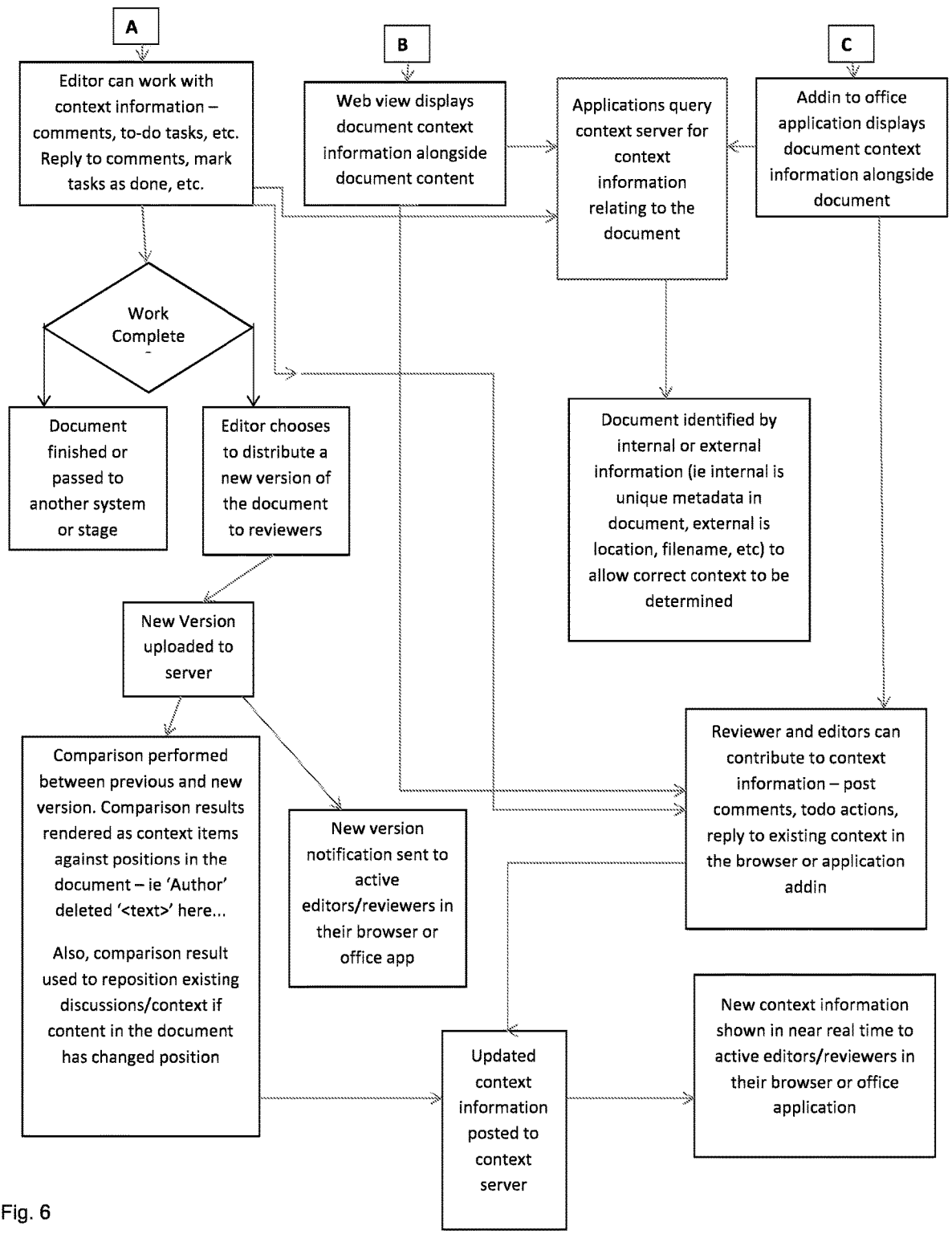
FIG. 6 shows the workflows originating from the FIG. 5 workflows.
Figure 7:
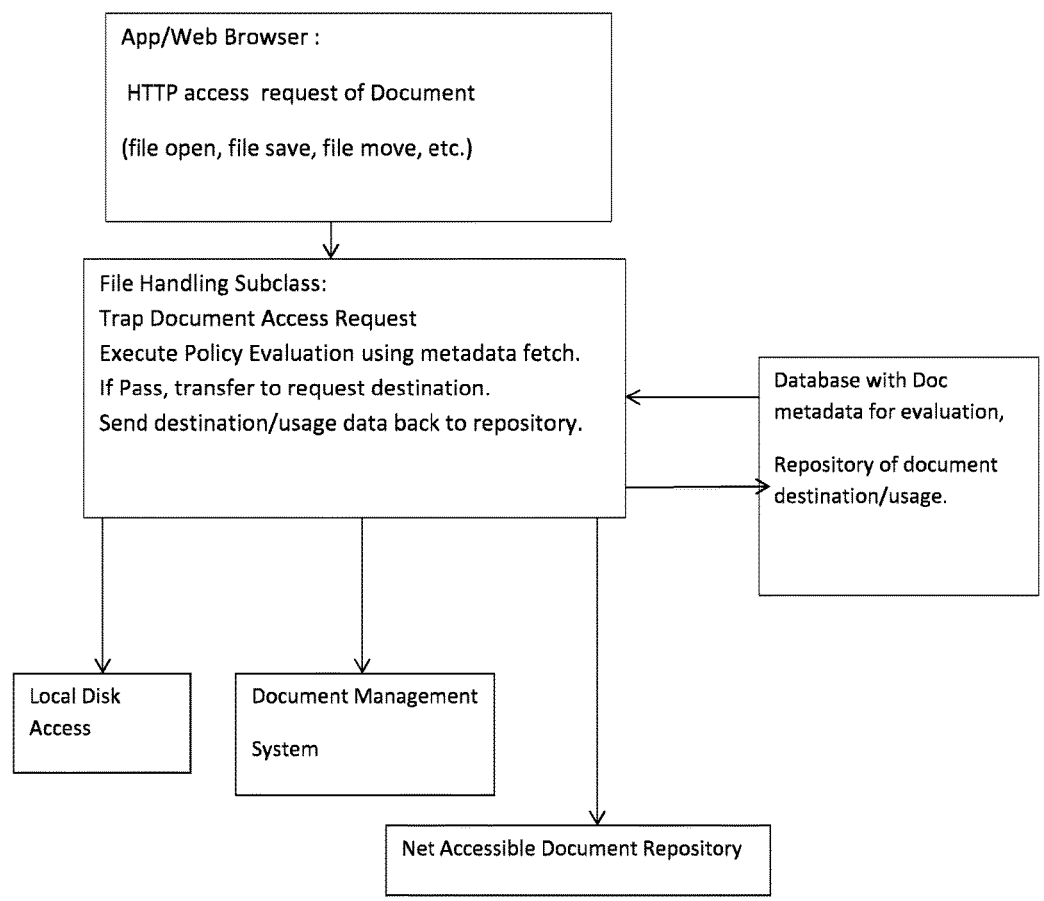
FIG. 7 shows flow chart for HTTP access and trapping for the file handling subclass.

A similar process may be used for file uploads, as depicted in FIG. 6. The same process may be used without an incumbent DMS. The process outlined above does not depend on their being a DMS system on the user's computer. In this case, the user would be offered files from their local computer, server or from a list of files they have stored in Workshare. All other parts of the workflow outlined above are still valid.

Using this method, the invention may be integrated for all of the above functionalities with any API based, client side (API installed on the user's computer) document management systems. Furthermore, the invention may be integrated to add both SaaS providers and client side API based systems to provide an ever growing mesh of integrations between each of these systems.

The invention stores data in its database (109) that may include the following fields for a transaction involving a document:

Source of uploaded document (i.e. an identifier which may include one or more of: a service identifier such as DMS or FileStore, a server identifier, a path or folder identifier, a file name identifier and a version identifier).

A user identifier indicating who performed the upload.

Date and time of upload.

Size of the uploaded file.

The SaaS service that the file was uploaded to (note that this is not a complete identifier of where on the SaaS platform the file has been stored, just an identifier of which SaaS platform was selected—this field may be just 'service.net' not 'service.net/user/123/folder/23456/file/1238972342'.

Additional information to be stored in the database might include:

A summary of metadata discovered in the document before upload.

Information on content policies triggered by the upload of the document.

Full location information specifying the exact location of the uploaded document.

However, full location information (i.e. a full URL to the place it was uploaded) may not be available at the time of upload, but may be deduced later (for instance by inspecting the SaaS platform contents using an appropriate API and the user's credentials and finding a file that matches the size and upload time).

In another embodiment, the system receives a link to the file on the third party DMS, and then automatically exercises the link to obtain the file. The file is transferred to the user's device for display or editing. When the user is finished, the database can save the revised file as a new version on its server. Alternatively, the server can run the file upload process to return the new version up to the third party DMS. In addition, the invention can run a comparison of the user's revised file with the obtained version.

Operating Environment: The system is typically comprised of a central server that is connected by a data network to a user's computer. The central server may be comprised of one or more computers connected to one or more mass storage devices. The precise architecture of the central server does not limit the claimed invention. Further, the user's computer may be a laptop or desktop type of personal computer. It can also be a cell phone, smart phone or other handheld device, including a tablet. The precise form factor of the user's computer does not limit the claimed invention. Examples of well known computing systems, environments, and/or configurations that may be suitable for use with the invention include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like. The precise form factor of the user's computer does not limit the claimed invention. In one embodiment, the user's computer is omitted, and instead a separate computing functionality provided that works with the central server. In this case, a user would log into the server from another computer and access the system through a user environment.

The user environment may be housed in the central server or operatively connected to it. Further, the user may receive from and transmit data to the central server by means of the Internet, whereby the user accesses an account using an Internet web-browser and browser displays an interactive web page operatively connected to the central server. The central server transmits and receives data in response to data and commands transmitted from the browser in response to the customer's actuation of the browser user interface. Some steps of the invention may be performed on the user's computer and interim results transmitted to a server. These interim results may be processed at the server and final results passed back to the user.

The method described herein can be executed on a computer system, generally comprised of a central processing unit (CPU) that is operatively connected to a memory device, data input and output circuitry (IO) and computer data network communication circuitry. Computer code executed by the CPU can take data received by the data communication circuitry and store it in the memory device. In addition, the CPU can take data from the I/O circuitry and store it in the memory device. Further, the CPU can take data from a memory device and output it through the IO circuitry or the data communication circuitry. The data stored in memory may be further recalled from the memory device, further processed or modified by the CPU in the manner described herein and restored in the same memory device or a different memory device operatively connected to the CPU including by means of the data network circuitry. The memory device can be any kind of data storage circuit or magnetic storage or optical device, including a hard disk, optical disk or solid state memory. The IO devices can include a display screen, loudspeakers, microphone and a movable mouse that indicate to the computer the relative location of a cursor position on the display and one or more buttons that can be actuated to indicate a command.

The computer can display on the display screen operatively connected to the I/O circuitry the appearance of a user interface. Various shapes, text and other graphical forms are displayed on the screen as a result of the computer generating data that causes the pixels comprising the display screen to take on various colors and shades. The user interface also displays a graphical object referred to in the art as a cursor. The object's location on the display indicates to the user a selection of another object on the screen. The cursor may be moved by the user by means of another device connected by I/O circuitry to the computer. This device detects certain physical motions of the user, for example, the position of the hand on a flat surface or the position of a finger on a flat surface. Such devices may be referred to in the art as a mouse or a track pad. In some embodiments, the display screen itself can act as a trackpad by sensing the presence and position of one or more fingers on the surface of the display screen. When the cursor is located over a graphical object that appears to be a button or switch, the user can actuate the button or switch by engaging a physical switch on the mouse or trackpad or computer device or tapping the trackpad or touch sensitive display. When the computer detects that the physical switch has been engaged (or that the tapping of the track pad or touch sensitive screen has occurred), it takes the apparent location of the cursor (or in the case of a touch sensitive screen, the detected position of the finger) on the screen and executes the process associated with that location. As an example, not intended to limit the breadth of the disclosed invention, a graphical object that appears to be a 2 dimensional box with the word "enter" within it may be displayed on the screen. If the computer detects that the switch has been engaged while the cursor location (or finger location for a touch sensitive screen) was within the boundaries of a graphical object, for example, the displayed box, the computer will execute the process associated with the "enter" command. In this way, graphical objects on the screen create a user interface that permits the user to control the processes operating on the computer.

The invention may also be entirely executed on one or more servers. A server may be a computer comprised of a central processing unit with a mass storage device and a network connection. In addition a server can include multiple of such computers connected together with a data network or other data transfer connection, or, multiple computers on a network with network accessed storage, in a manner that provides such functionality as a group. Practitioners of ordinary skill will recognize that functions that are accomplished on one server may be partitioned and accomplished on multiple servers that are operatively connected by a computer network by means of appropriate inter process communication. In addition, the access of the website can be by means of an Internet browser accessing a secure or public page or by means of a client program running on a local computer that is connected over a computer network to the server. A data message and data upload or download can be delivered over the Internet using typical protocols, including TCP/IP, HTTP, TCP, UDP, SMTP, RPC, FTP or other kinds of data communication protocols that permit processes running on two remote computers to exchange information by means of digital network communication. As a result a data message can be a data packet transmitted from or received by a computer containing a destination network address, a destination process or application identifier, and data values that can be parsed at the destination computer located at the destination network address by the destination application in order that the relevant data values are extracted and used by the destination application. The precise architecture of the central server does not limit the claimed invention. In addition, the data network may operate with several levels, such that the user's computer is connected through a fire wall to one server, which routes communications to another server that executes the disclosed methods.

The user computer can operate a program that receives from a remote server a data file that is passed to a program that interprets the data in the data file and commands the display device to present particular text, images, video, audio and other objects. The program can detect the relative location of the cursor when the mouse button is actuated, and interpret a command to be executed based on location on the indicated relative location on the display when the button was pressed. The data file may be an HTML document, the program a web-browser program and the command a hyperlink that causes the browser to request a new HTML document from another remote data network address location. The HTML can also have references that result in other code modules being called up and executed, for example, Flash or other native code.

Those skilled in the relevant art will appreciate that the invention can be practiced with other communications, data processing, or computer system configurations, including: wireless devices, Internet appliances, hand-held devices (including personal digital assistants (PDAs)), wearable computers, all manner of cellular or mobile phones, multi-processor systems, microprocessor-based or programmable consumer electronics, set-top boxes, network PCs, minicomputers, mainframe computers, and the like. Indeed, the terms "computer," "server," and the like are used interchangeably herein, and may refer to any of the above devices and systems.

In some instances, especially where the user computer is a mobile computing device used to access data through the network the network may be any type of cellular, IP-based or converged telecommunications network, including but not limited to Global System for Mobile Communications (GSM), Time Division Multiple Access (TDMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), Worldwide Interoperability for Microwave Access (WiMAX), Universal Mobile Telecommunications System (UMTS), Evolution-Data Optimized (EVDO), Long Term Evolution (LTE), Ultra Mobile Broadband (UMB), Voice over Internet Protocol (VoIP), or Unlicensed Mobile Access (UMA).

The Internet is a computer network that permits customers operating a personal computer to interact with computer servers located remotely and to view content that is delivered from the servers to the personal computer as data files over the network. In one kind of protocol, the servers present webpages that are rendered on the customer's personal computer using a local program known as a browser. The browser receives one or more data files from the server that are displayed on the customer's personal computer screen. The browser seeks those data files from a specific address, which is represented by an alphanumeric string called a Universal Resource Locator (URL). However, the webpage may contain components that are downloaded from a variety of URL's or IP addresses. A website is a collection of related URL's, typically all sharing the same root address or under the control of some entity. In one embodiment different regions of the simulated space have different URL's. That is, the simulated space can be a unitary data structure, but different URL's reference different locations in the data structure. This makes it possible to simulate a large area and have participants begin to use it within their virtual neighborhood.

Computer program logic implementing all or part of the functionality previously described herein may be embodied in various forms, including, but in no way limited to, a source code form, a computer executable form, and various intermediate forms (e.g., forms generated by an assembler, compiler, linker, or locator.) Source code may include a series of computer program instructions implemented in any of various programming languages (e.g., an object code, an assembly language, or a high-level language such as C, C++, C#, Action Script, PHP, EcmaScript, JavaScript, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The invention may be described in the general context of computer-executable instructions, such as program modules, being executed by a computer. Generally, program modules include routines, programs, objects, components, data structures, etc., that perform particular tasks or implement particular abstract data types. The computer program and data may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed hard disk), an optical memory device (e.g., a CD-ROM or DVD), a PC card (e.g., PCMCIA card), or other memory device. The computer program and data may be fixed in any form in a signal that is transmittable to a computer using any of various communication technologies, including, but in no way limited to, analog technologies, digital technologies, optical technologies, wireless technologies, networking technologies, and internetworking technologies. The computer program and data may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system (e.g., the Internet or World Wide Web.) It is appreciated that any of the software components of the present invention may, if desired, be implemented in ROM (read-only memory) form. The software components may, generally, be implemented in hardware, if desired, using conventional techniques.

The invention may also be practiced in distributed computing environments where tasks are performed by remote processing devices that are linked through a communications network. In a distributed computing environment, program modules may be located in both local and remote computer storage media including memory storage devices. Practitioners of ordinary skill will recognize that the invention may be executed on one or more computer processors that are linked using a data network, including, for example, the Internet. In another embodiment, different steps of the process can be executed by one or more computers and storage devices geographically separated by connected by a data network in a manner so that they operate together to execute the process steps. In one embodiment, a user's computer can run an application that causes the user's computer to transmit a stream of one or more data packets across a data network to a second computer, referred to here as a server. The server, in turn, may be connected to one or more mass data storage devices where the database is stored. The server can execute a program that receives the transmitted packet and interpret the transmitted data packets in order to extract database query information. The server can then execute the remaining steps of the invention by means of accessing the mass storage devices to derive the desired result of the query. Alternatively, the server can transmit the query information to another computer that is connected to the mass storage devices, and that computer can execute the invention to derive the desired result. The result can then be transmitted back to the user's computer by means of another stream of one or more data packets appropriately addressed to the user's computer. In one embodiment, the relational database may be housed in one or more operatively connected servers operatively connected to computer memory, for example, disk drives. In yet another embodiment, the initialization of the relational database may be prepared on the set of servers and the interaction with the user's computer occur at a different place in the overall process.

It should be noted that the flow diagrams are used herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Oftentimes, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The described embodiments of the invention are intended to be exemplary and numerous variations and modifications will be apparent to those skilled in the art. All such variations and modifications are intended to be within the scope of the present invention as defined in the appended claims. Although the present invention has been described and illustrated in detail, it is to be clearly understood that the same is by way of illustration and example only, and is not to be taken by way of limitation. It is appreciated that various features of the invention which are, for clarity, described in the context of separate embodiments may also be provided in combination in a single embodiment. Conversely, various features of the invention which are, for brevity, described in the context of a single embodiment may also be provided separately or in any suitable combination.

The foregoing description discloses only exemplary embodiments of the invention. Modifications of the above disclosed apparatus and methods which fall within the scope of the invention will be readily apparent to those of ordinary skill in the art. Accordingly, while the present invention has been disclosed in connection with exemplary embodiments thereof, it should be understood that other embodiments may fall within the spirit and scope of the invention as defined by the following claims.

What is claimed:

1. A computer executed method of securing a file access request between a device and an external file server with a corresponding location data, said device executing a program using a file location access protocol that is invoked by at least one object class and said external file server being accessible by the device as a wide area network protocol location, comprising:

Operating an intercept process where said intercept process is invoked as a subclass of one of the at least one invoked file location access protocol object classes, and said intercept process intercepts the request by the invoked object class to access the external file server, where the request designates the external file server location in accordance with a wide area network protocol;

Said invoked intercept process passing to a security inspection process the external file server location extracted from the data representing the intercepted request;

executing the security inspection process on the extracted data; and in dependence on the result of the security inspection process, the intercept process either permitting or blocking the execution of the request.

2. The method of claim 1 where the program is an Internet browser program and the wide area network protocol is the HTTP or HTTPS protocol.

3. The method of claim 2 where the request by the browser is implemented by interpreting a script received by the device and passed to the browser program.

4. The method of claim 1 where the program is a dedicated application operating on the device that interprets a script transmitted to the application from the external file server.

5. The method of claim 3 or 4 where upon the security inspection protocol result being to permit the request, either the file or a pointer to the file being passed to the interpreted script process.

6. The method of claim 1 further comprising: receiving as input into the file access protocol at least one parameter.

7. The method of claim 4 where the intercept process intercepts the file access request made by the program making the file access request and upon a determination by the security process that the request is permitted, delivering either the requested file or a pointer to the file requested by the program, where the intercept process is a separate program from the program making the file access request.

8. The method of claim 1 where the security inspection process is executed on the device.

9. The method of claim 1 further comprising:
receiving at least one parameter as input into the file access protocol;
transmitting the at least one parameter input into the file access protocol to a remote security server that executes the security inspection process; and
receiving data representing the security inspection process result.

10. The method of claim 1 further comprising:
on the device, installing computer code embodying the file access request intercept process; and
upon installation of the computer code, storing on the device a token data associated with the installed computer code.

11. The method of claim 10 further comprising:
receiving at the security server the stored token data; and
using the received token data as an input into the security inspection process.

12. The method of claim 1 further comprising:
storing in a data record the location data and at least one of the at least one parameters input into the intercepted file access request protocol.

13. The method of claim 12 where the storing step is performed on an external security server.

14. The method of claim 1 where the location data is at least part of a URL of the external file server.

15. The method of claim 6 where the at least one parameter is a user identifier associated with the device.

16. The method of claim 1 where the location data is a full URL of a browser application making the request.

17. The method of claim 6 where the at least one parameter is at least part of a metadata associated with the requested file.

18. The method of claim 6 where the at least one parameter is an at least part of the data comprising the requested file.

19. The method of claim 6 where the at least one parameter is a time and date of the request.

20. The method of claim 1 further comprising:
executing a security action in dependence on an output of the security inspection process.

21. The method of claim 20 where the security action is executed before transmitting the file and comprises one of: converting the format of the requested file, removing metadata from the requested file, removing at least part of the data comprising the requested file, encrypting the requested file using a predetermined encryption key, transmitting a message from the security server comprising an alert that the request for the file was made, generating a data value representing a fingerprint of the requested file, generating a digital signature for the requested file, inserting steganographic data into the requested file.

22. A computer system for automatically managing the movement of document files from a first document storage sub-system to a second document storage sub-system comprising:
a module adapted by logic executing on a first computer comprising the system to execute a first file selection procedure using as input commands received from a user interacting with the first computer in order to select a document stored on the first sub-system;
a module adapted by logic to execute on the first computer a first application programming interface protocol associated with the first sub-system in order to use the output of the first file selection procedure to submit to the first sub-system a request to obtain the selected document from the first sub-system;
a module adapted by logic executing on the first computer to receive from the first sub-system the selected document and store the document;
a module adapted by logic executed by the first computer to execute a second destination selection procedure process using as input commands and data received from the user in order to select a destination comprised of the second sub-system; and
a module adapted by logic to invoke an object class as a second application programming interface associated with the second sub-system in order to use the output of the destination selection procedure and to transmit the selected document to the second sub-system; and
a module adapted by logic to invoke as a sub-class to the invoked object class an intercept process that intercepts the destination selection process where the invoked subclass passes data representing the output of the destination selection procedure to a security inspection process.

23. The system of claim 22:
where the module adapted by logic to execute a security inspection process is further adapted by logic to apply a security policy to a selected document and a selected destination and in dependence on the output of such security policy, permit or deny transmitting the selected document to the second sub-system.

24. The system of claim 22 further comprising:
a database adapted by logic to store a data record associated with the selected document comprised of data representing at least one of: the identity of the user, the identity of the selected destination, a date and time of the receipt of the selected document, a date and time of the transmission of the selected document, the identity of the second sub-system.

25. The system of claim 22 further comprising:
a module adapted by logic to perform one of: convert the format of the selected document file, remove hidden metadata, comments or confidential information from the selected document file, redact at least part of the selected document file.

26. The system of claim 22 further comprising:
a module that is adapted by logic to present to the user a user interface of an application program file selection process;
a module adapted by logic to intercept an executing file selection process of the application program file in order to determine a file selection designation input by the user;
a module adapted by logic to transform the determined file selection designation into a command to the first sub-system to obtain the file designated by the intercepted file selection designation and to receive the file;
a module adapted by logic that passes the received file or a pointer to the received file to the application.

27. The system of claim 22 further comprising:
a module adapted by logic to store a data structure associated with the received selected file that maps a first predetermined set of document file attributes associated with a first document management system further corresponding to the first sub-system to a second predetermined set of document file attributes associated with a second document management system corresponding to the second sub-system; and data retrieved from the stored data structure to automatically generate the request to store the document on the second sub-system that conforms to the second application programming interface.

\* \* \* \* \*